United States Patent
Cao et al.

(10) Patent No.: US 11,067,708 B2
(45) Date of Patent: Jul. 20, 2021

(54) PORTABLE RADIATION DETECTOR SYSTEM

(71) Applicant: SHENZHEN XPECTVISION TECHNOLOGY CO., LTD., Shenzhen (CN)

(72) Inventors: Peiyan Cao, Shenzhen (CN); Yurun Liu, Shenzhen (CN)

(73) Assignee: SHENZHEN XPECTVISION TECHNOLOGY CO., LTD., Shenzhen (CN)

(*) Notice: Subject to any disclaimer, the term of this patent is extended or adjusted under 35 U.S.C. 154(b) by 128 days.

(21) Appl. No.: 16/565,450

(22) Filed: Sep. 9, 2019

(65) Prior Publication Data
US 2020/0003914 A1 Jan. 2, 2020

Related U.S. Application Data

(63) Continuation of application No. PCT/CN2017/079182, filed on Apr. 1, 2017.

(51) Int. Cl.
*G01T 1/24* (2006.01)

(52) U.S. Cl.
CPC .................................. *G01T 1/244* (2013.01)

(58) Field of Classification Search
CPC ......... A61B 6/4241; G01T 1/244; G01T 1/24; G01T 1/161; G01T 1/1645; G01T 1/169; G01T 1/17; G01T 1/242
See application file for complete search history.

(56) References Cited

U.S. PATENT DOCUMENTS

| 2010/0020924 A1* | 1/2010 | Steadman Booker .... G01T 1/17 378/19 |
| 2014/0334600 A1* | 11/2014 | Lee ........................ A61B 6/482 378/62 |

FOREIGN PATENT DOCUMENTS

| CN | 102445704 A | 5/2012 |
| EP | 2813865 A1 | 12/2014 |
| WO | 201616544 A1 | 10/2016 |
| WO | 2016161542 A1 | 10/2016 |
| WO | 2016161543 A1 | 10/2016 |

* cited by examiner

*Primary Examiner* — David P Porta
*Assistant Examiner* — Fani Boosalis
(74) *Attorney, Agent, or Firm* — IPro, PLLC; Qian Gu

(57) ABSTRACT

An apparatus for detecting radiation, comprising: a first radiation absorption layer configured to generate first electrical signals from a photon of the radiation absorbed by the first radiation absorption layer, wherein the first radiation absorption layer comprises a first electrode; an electronic system configured to process the first electrical signals; a counter configured to register a number of photons absorbed by the radiation absorption layer; a controller; the controller is configured to cause the number registered by the counter to increase by one; a power supply; and a communication interface configured for the electronic system to communicate with outside circuitry.

20 Claims, 14 Drawing Sheets

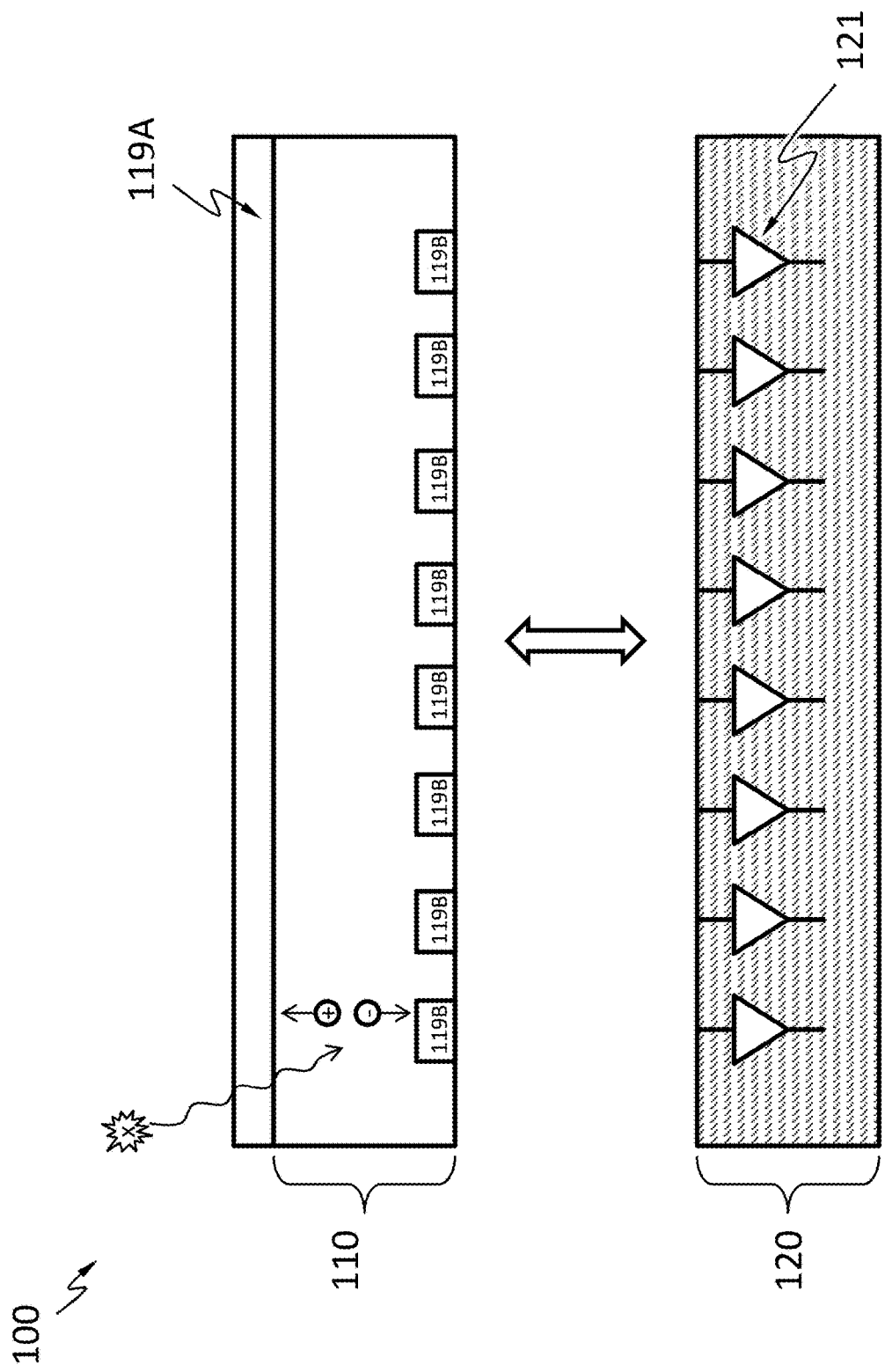

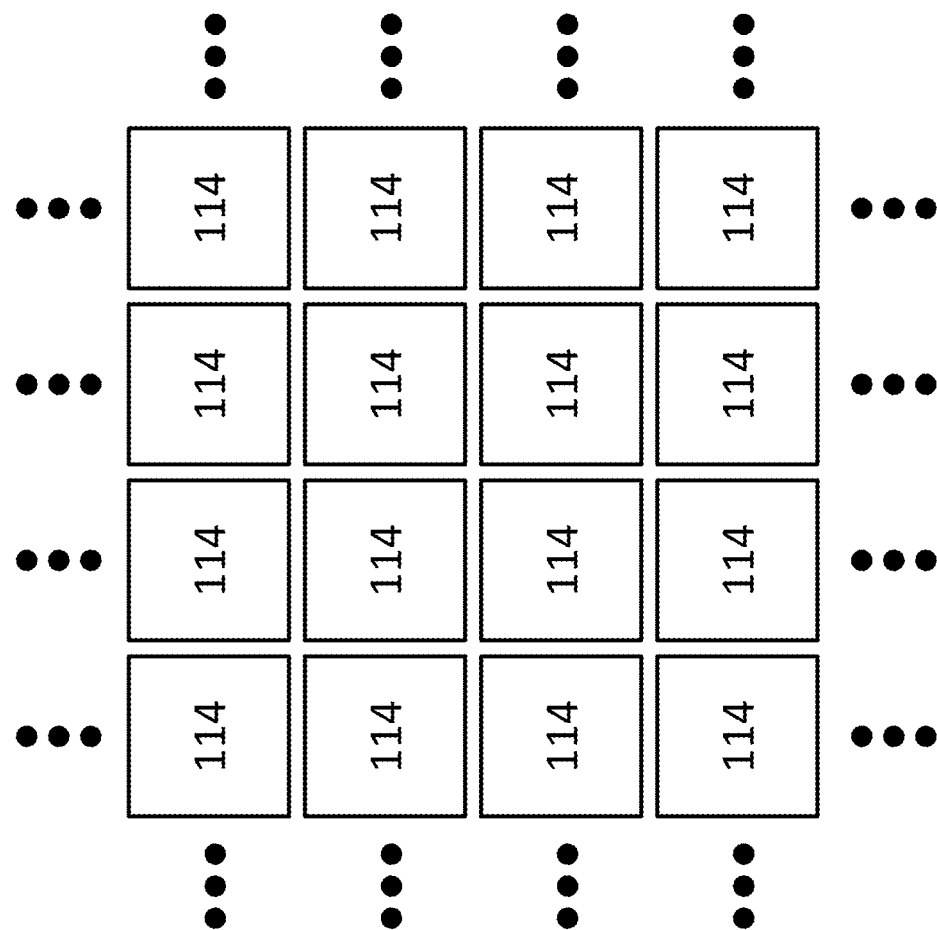

PORTABLE RADIATION DETECTOR SYSTEM

TECHNICAL FIELD

The disclosure herein relates to a portable radiation detector.

BACKGROUND

Radiation detectors may be devices used to measure the flux, spatial distribution, spectrum or other properties of various radiations, like X-rays, gamma rays, alpha and betta radiations.

Radiation detectors may be used for many applications. One important application is to monitor and measure the radiation exposure in the material or in the environment.

Early radiation detectors comprise electrodes surrounding by a gas. When the detector is exposed to X-rays or other radiation sources, the gas is ionized. The electrons generated by the ionization, are attracted to the positive charged electrodes and an electric current pulse is therefore detected and counted.

Proportional counters or various types of solid-state detectors (PIN diode, Si(Li), Ge(Li), Silicon Drift Detector SDD) may be used in radiation detection applications. These detectors are based on the same principle: an incoming radiation photon ionizes a large number of detector atoms with the amount of charge carriers produced being proportional to the energy of the incoming radiation photon. The charge carriers are collected and counted to determine the energy of the incoming radiation photon. After detection of many radiation photons, a spectrum may be compiled by counting the number of radiation photons as a function of their energy.

SUMMARY

Disclosed herein is an apparatus suitable for detecting radiation, comprising: a first radiation absorption layer configured to generate first electrical signals from a photon of the radiation absorbed by the first radiation absorption layer, wherein the first radiation absorption layer comprises a first electrode; an electronic system configured to process the first electrical signals, wherein the electronic system comprises a first voltage comparator configured to compare a voltage of the electrode to a first threshold; a second voltage comparator configured to compare the voltage to a second threshold; a counter configured to register a number of radiation photons absorbed by the radiation absorption layer; a controller; wherein the controller is configured to start a time delay from a time at which the first voltage comparator determines that an absolute value of the voltage equals or exceeds an absolute value of the first threshold; wherein the controller is configured to activate the second voltage comparator during (including the beginning and the expiration) the time delay; wherein the controller is configured to cause the number registered by the counter to increase by one, if the second voltage comparator determines that an absolute value of the voltage equals or exceeds an absolute value of the second threshold; a power supply; and a communication interface configured for the electronic system to communicate with outside circuitry; wherein the system is selected from a group consisting of a ID card, an access badge, a radiation detection pen, a piece of apparel, a wristband, a watch, a headphone, a cell phone, a cell phone accessory, a smoke detector, and a food radiation detection apparatus.

According to an embodiment, the apparatus further comprises a capacitor module electrically connected to the electrode, wherein the capacitor module is configured to collect charge carriers from the electrode.

According to an embodiment, the controller is configured to activate the second voltage comparator at a beginning or expiration of the time delay.

According to an embodiment, the system further comprises a voltmeter, wherein the controller is configured to cause the voltmeter to measure the voltage upon expiration of the time delay.

According to an embodiment, the controller is configured to determine an energy of a photon of the radiation based on a value of the voltage measured upon expiration of the time delay.

According to an embodiment, the controller is configured to connect the first electrode to an electrical ground.

According to an embodiment, a rate of change of the voltage of is substantially zero at expiration of the time delay.

According to an embodiment, a rate of change of the voltage is substantially non-zero at expiration of the time delay.

According to an embodiment, the controller is configured to deactivate the first voltage comparator at a beginning of the time delay.

According to an embodiment, the controller is configured to deactivate the second voltage comparator at expiration of the time delay or at a time when the second voltage comparator determines that the absolute value of the voltage equals or exceeds the absolute value of the second threshold, or a time in between.

According to an embodiment, the first radiation absorption layer comprises a diode.

According to an embodiment, the first radiation absorption layer comprises silicon, germanium, GaAs, CdTe, CdZnTe, or a combination thereof.

According to an embodiment, the apparatus does not comprise a scintillator.

According to an embodiment, the apparatus comprises a second radiation absorption layer configured to generate second electrical signals from a photon of the radiation absorbed by the second radiation absorption layer, wherein an electronic system is configured to process the second electrical signals.

According to an embodiment, the electronic system of the first absorption layer is not stacked with the first radiation absorption layer.

According to an embodiment, the power supply comprises a battery.

According to an embodiment, the power management unit comprises a DC-to-DC converter.

According to an embodiment, the apparatus further comprises a GPS receiver configured to record a location of a radiation detected by the apparatus.

According to an embodiment, the system further comprises a display configured to show information detected by the apparatus.

According to an embodiment, the apparatus further comprises a wireless transmitter configured to transmit information of radiation detected by the apparatus to a receiving device.

BRIEF DESCRIPTION OF FIGURES

FIG. 1B schematically shows a radiation detector, according to an embodiment.

FIG. 2 shows a top view of a portion of the radiation detector in FIG. 1A, according to an embodiment.

DETAILED DESCRIPTION

Figure 1A:
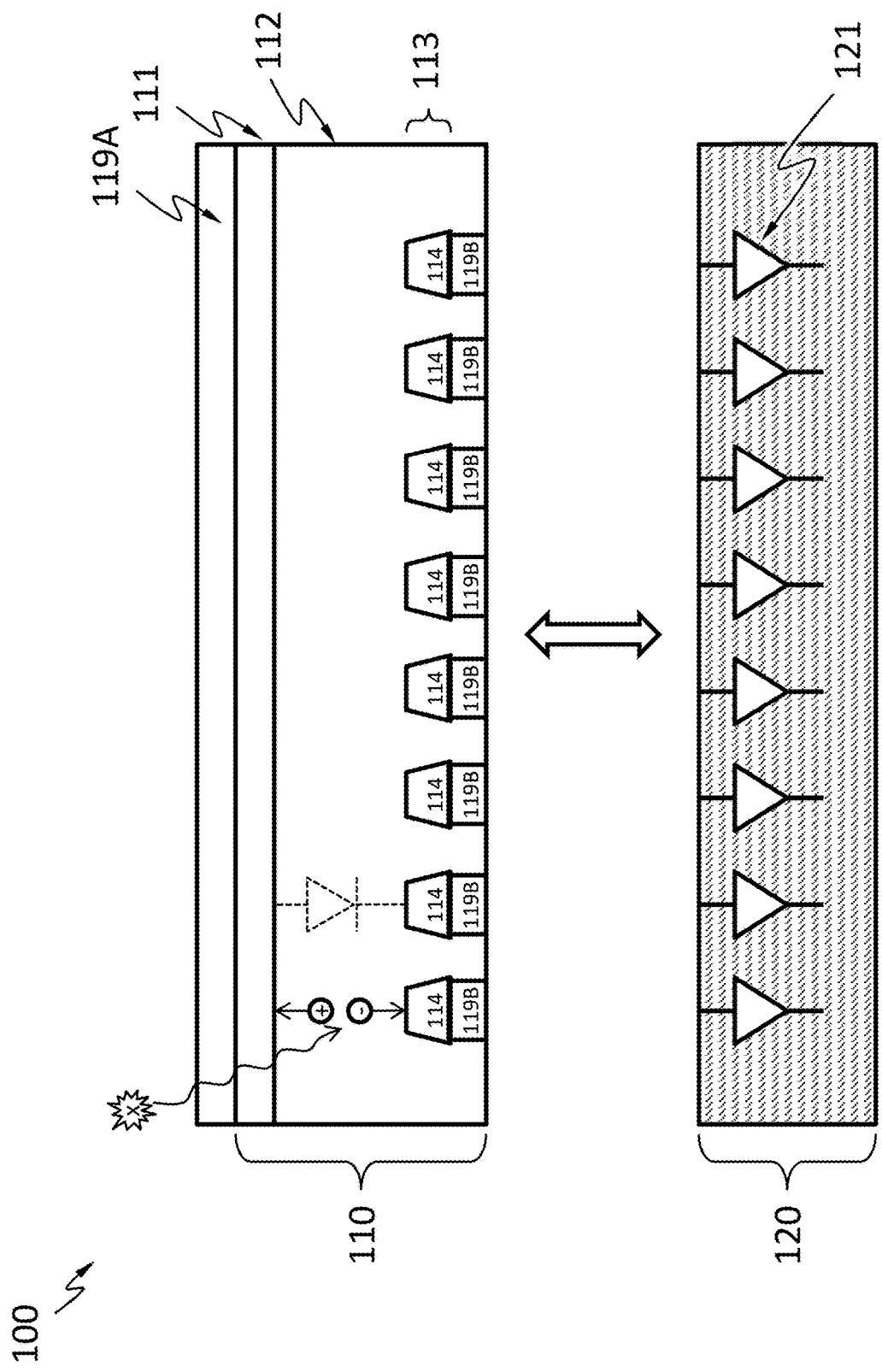
FIG. 1A schematically shows a radiation detector, according to an embodiment.

FIG. 1A schematically shows a radiation detector 100, according to an embodiment. The radiation detector 100 may include a first radiation absorption layer 110 and an electronic system 120 (e.g., an ASIC) for processing or analyzing electrical signals incident radiation generates in the first radiation absorption layer 110. In an embodiment, the radiation detector 100 does not comprise a scintillator. The first radiation absorption layer 110 may include a semiconductor material such as, silicon, germanium, GaAs, CdTe, CdZnTe, or a combination thereof. The semiconductor may have a high mass attenuation coefficient for the radiation energy of interest. The first radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional the intrinsic region 112. The discrete regions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example in FIG. 1A, each of the discrete regions 114 of the second doped region 113 forms a diode with the first doped region 111 and the optional intrinsic region 112. Namely, in the example in FIG. 1A, the first radiation absorption layer 110 has a plurality of diodes having the first doped region 111 as a shared electrode. The first doped region 111 may also have discrete portions.

FIG. 1B shows a radiation detector 100, according to an embodiment. The radiation detector 100 may include a first radiation absorption layer 110 and an electronic system 120 (e.g., an ASIC) for processing or analyzing electrical signals incident radiation generates in the first radiation absorption layer 110. In an embodiment, the radiation detector 100 does not comprise a scintillator. The first radiation absorption layer 110 may include a semiconductor material such as, silicon, germanium, GaAs, CdTe, CdZnTe, or a combination thereof. The semiconductor may have a high mass attenuation coefficient for the radiation energy of interest. The first radiation absorption layer 110 may not include a diode but includes a resistor.

When a radiation photon hits the first radiation absorption layer 110 including diodes, it may be absorbed and generate one or more charge carriers by a number of mechanisms. A radiation photon may generate 10 to 100000 charge carriers. The charge carriers may drift to the electrodes of one of the diodes under an electric field. The field may be an external electric field. The electrical contact 119B may include discrete portions each of which is in electrical contact with the discrete regions 114. In an embodiment, the charge carriers may drift in directions such that the charge carriers generated by a single photon are not substantially shared by two different discrete regions 114 ("not substantially shared" here means less than 5%, less than 2% or less than 1% of these charge carriers flow to a different one of the discrete regions 114 than the rest of the charge carriers). In an embodiment, the charge carriers generated by a single radiation photon can be shared by two different discrete regions 114.

FIG. 2 shows a top view of a portion of the radiation detector 100 with a 4-by-4 array of discrete regions 114. Charge carriers generated by a radiation photon incident around the footprint of one of these discrete regions 114 are not substantially shared with another of these discrete regions 114. The area around a discrete region 114 in which substantially all (more than 95%, more than 98% or more than 99% of) charge carriers generated by a radiation photon incident therein flow to the discrete region 114 is called a pixel associated with that discrete region 114. Namely, less than 5%, less than 2% or less than 1% of these charge carriers flow beyond the pixel. By measuring the drift current flowing into each of the discrete regions 114, or the rate of change of the voltage of each of the discrete regions 114, the number of radiation photons absorbed (which relates to the incident radiation intensity) and/or the energies thereof in the pixels associated with the discrete regions 114 may be determined. Thus, the energy distribution of incident radiation intensity may be determined by individually measuring the drift current into each one of an array of discrete regions 114 or measuring the rate of change of the voltage of each one of an array of discrete regions 114. The pixels may be organized in any suitable array, such as, a square array, a triangular array and a honeycomb array. The pixels may have any suitable shape, such as, circular, triangular, square, rectangular, and hexangular. The discrete regions 114 may have any suitable size (e.g., >1 $mm^2$, >5 $mm^2$, >10 $mm^2$, >100 $mm^2$).

When a radiation photon hits the first radiation absorption layer 110 including a resistor but not diodes, it may be absorbed and generate one or more charge carriers by a number of mechanisms. A radiation photon may generate 10 to 100000 charge carriers. The charge carriers may drift to the electrical contacts 119A and 119B under an electric field. The field may be an external electric field. The electrical contact 119B includes discrete portions. In an embodiment, the charge carriers may drift in directions such that the charge carriers generated by a single radiation photon are not substantially shared by two different discrete portions of the electrical contact 119B ("not substantially shared" here means less than 5%, less than 2% or less than 1% of these charge carriers flow to a different one of the discrete portions than the rest of the charge carriers). In an embodiment, the charge carriers generated by a single radiation photon can be shared by two different discrete portions of the electrical contact 119B. Charge carriers generated by a radiation photon incident around the footprint of one of these discrete portions of the electrical contact 119B are not substantially shared with another of these discrete portions of the electrical contact 119B. The area around a discrete portion of the electrical contact 119B in which substantially all (more than 95%, more than 98% or more than 99% of) charge carriers generated by a radiation photon incident therein flow to the discrete portion of the electrical contact 119B is called a pixel associated with the discrete portion of the electrical contact 119B. Namely, less than 5%, less than 2% or less than 1% of these charge carriers flow beyond the pixel associated with the one discrete portion of the electrical contact 119B. By measuring the drift current flowing into each of the discrete portion of the electrical contact 119B, or the rate of change of the voltage of each of the discrete portions of the electrical contact 119B, the number of radiation photons absorbed (which relates to the incident radiation intensity) and/or the energies thereof in the pixels associated with the discrete portions of the electrical contact 119B may be determined. The pixels may be organized in any suitable array, such as, a square array, a triangular array and a honeycomb array. The pixels may have any suitable shape, such as, circular, triangular, square, rectangular, and hexagonal. The discrete portions of the electrical contacts 119B may have any suitable size (e.g., $>1$ mm$^2$, $>5$ mm$^2$, $>10$ mm$^2$, $>100$ mm$^2$).

The electronic system 120 may include an electronic system 121 suitable for processing or analyzing signals generated by radiation photons incident on the first radiation absorption layer 110. The electronic system 121 may include an analog circuitry such as a filter network, amplifiers, integrators, and comparators, or a digital circuitry such as a microprocessor, and memory. The electronic system 121 may include components shared by the pixels or components dedicated to a single pixel. For example, the electronic system 121 may include an amplifier dedicated to each pixel and a microprocessor shared among all the pixels.

Figure 3A:
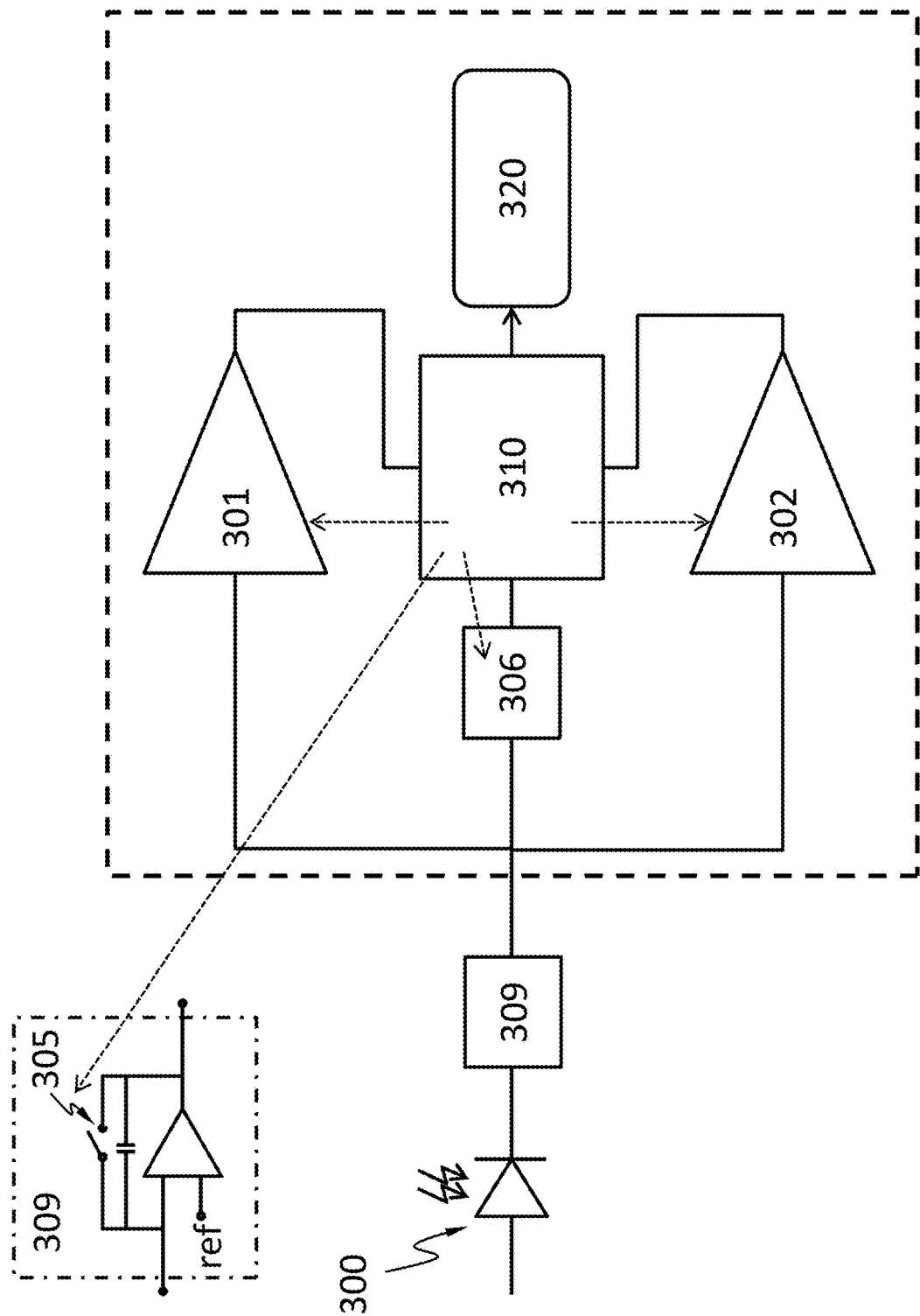
FIG. 3A and FIG. 3B each show a component diagram of an electronic system of the radiation detector in FIG. 1A or FIG. 1B, according to an embodiment.
Figure 3B:
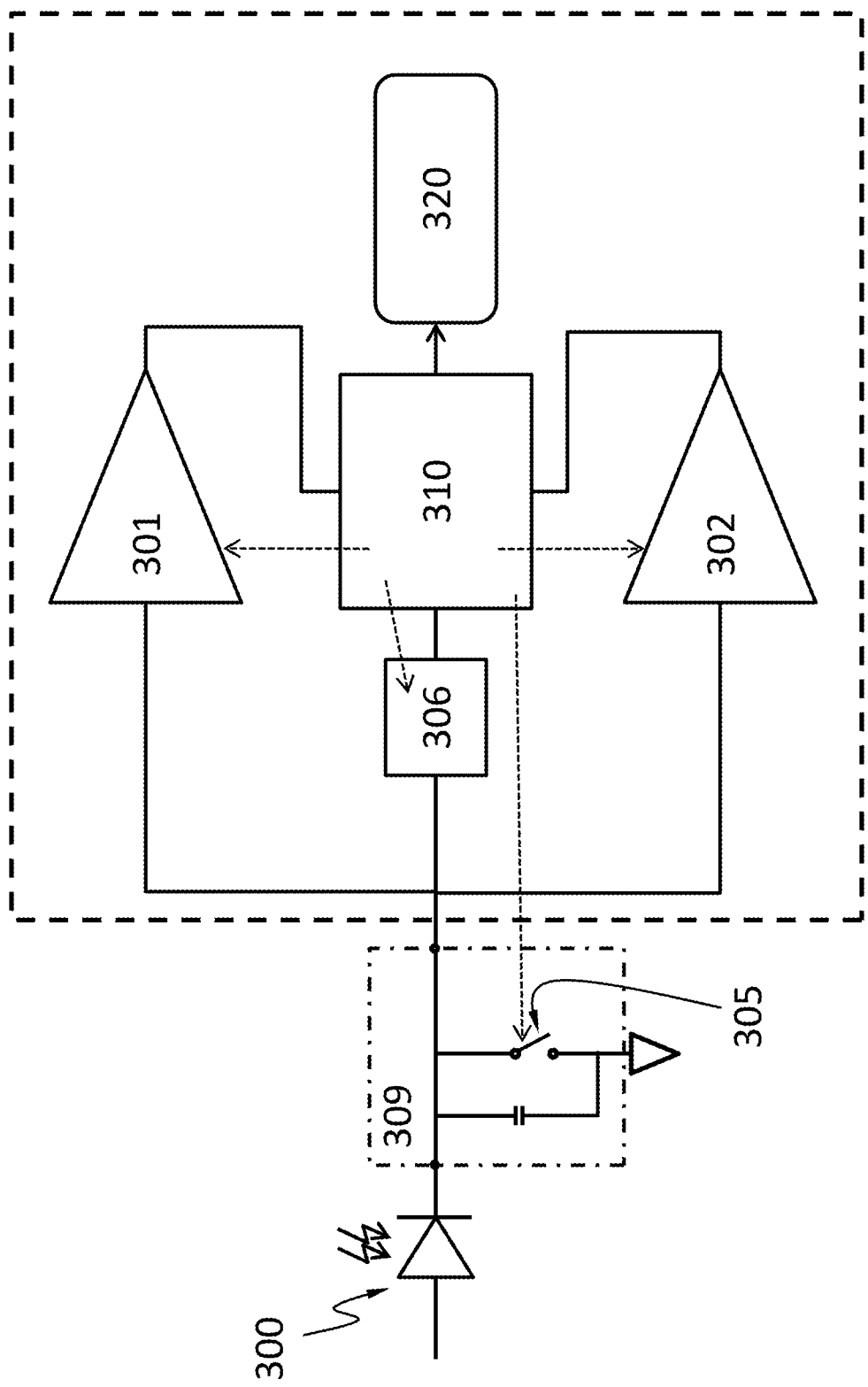

FIG. 3A and FIG. 3B each show a component diagram of the electronic system 121, according to an embodiment. The electronic system 121 may include a first voltage comparator 301, a second voltage comparator 302, a counter 320, a switch 305, a voltmeter 306 and a controller 310.

The first voltage comparator 301 is configured to compare the voltage of an electrode of a diode 300 to a first threshold. The diode may be a diode formed by the first doped region 111, one of the discrete regions 114 of the second doped region 113, and the optional intrinsic region 112. Alternatively, the first voltage comparator 301 is configured to compare the voltage of an electrical contact (e.g., a discrete portion of electrical contact 119B) to a first threshold. The first voltage comparator 301 may be configured to monitor the voltage directly, or calculate the voltage by integrating an electric current flowing through the diode or electrical contact over a period of time. The first voltage comparator 301 may be controllably activated or deactivated by the controller 310. The first voltage comparator 301 may be a continuous comparator. Namely, the first voltage comparator 301 may be configured to be activated continuously, and monitor the voltage continuously. The first voltage comparator 301 configured as a continuous comparator reduces the chance that the electronic system 121 misses signals generated by an incident radiation photon. The first voltage comparator 301 configured as a continuous comparator is especially suitable when the incident radiation intensity is relatively high. The first voltage comparator 301 may be a clocked comparator, which has the benefit of lower power consumption. The first voltage comparator 301 configured as a clocked comparator may cause the electronic system 121 to miss signals generated by some incident radiation photons. When the incident radiation intensity is low, the chance of missing an incident radiation photon is low because the time interval between two successive photons is relatively long. Therefore, the first voltage comparator 301 configured as a clocked comparator is especially suitable when the incident radiation intensity is relatively low. The first threshold may be 5-10%, 10%-20%, 20-30%, 30-40% or 40-50% of the maximum voltage one incident radiation photon may generate in the diode or the resistor. The maximum voltage may depend on the energy of the incident radiation photon (i.e., the wavelength of the incident radiation), the material of the first radiation absorption layer 110, and other factors. For example, the first threshold may be 50 mV, 100 mV, 150 mV, or 200 mV.

The second voltage comparator 302 is configured to compare the voltage to a second threshold. The second voltage comparator 302 may be configured to monitor the voltage directly, or calculate the voltage by integrating an electric current flowing through the diode or the electrical contact over a period of time. The second voltage comparator 302 may be a continuous comparator. The second voltage comparator 302 may be controllably activate or deactivated by the controller 310. When the second voltage comparator 302 is deactivated, the power consumption of the second voltage comparator 302 may be less than 1%, less than 5%, less than 10% or less than 20% of the power consumption when the second voltage comparator 302 is activated. The absolute value of the second threshold is greater than the absolute value of the first threshold. As used herein, the term "absolute value" or "modulus" |x| of a real number x is the non-negative value of x without regard to its sign. Namely, $$|x| = \begin{cases} x, & \text{if } x \geq 0 \\ -x, & \text{if } x \leq 0 \end{cases}.$$

The second threshold may be 200%-300% of the first threshold. The second threshold may be at least 50% of the maximum voltage one incident radiation photon may generate in the diode or resistor. For example, the second threshold may be 100 mV, 150 mV, 200 mV, 250 mV or 300 mV. The second voltage comparator 302 and the first voltage comparator 310 may be the same component. Namely, the system 121 may have one voltage comparator that can compare a voltage with two different thresholds at different times.

The first voltage comparator 301 or the second voltage comparator 302 may include one or more op-amps or any other suitable circuitry. The first voltage comparator 301 or the second voltage comparator 302 may have a high speed to allow the electronic system 121 to operate under a high flux of incident radiation. However, having a high speed is often at the cost of power consumption.

The counter 320 is configured to register a number of radiation photons reaching the diode or resistor. The counter 320 may be a software component (e.g., a number stored in a computer memory) or a hardware component (e.g., a 4017 IC and a 7490 IC).

The controller 310 may be a hardware component such as a microcontroller and a microprocessor. The controller 310 is configured to start a time delay from a time at which the first voltage comparator 301 determines that the absolute value of the voltage equals or exceeds the absolute value of the first threshold (e.g., the absolute value of the voltage increases from below the absolute value of the first threshold to a value equal to or above the absolute value of the first threshold). The absolute value is used here because the voltage may be negative or positive, depending on whether the voltage of the cathode or the anode of the diode or which electrical contact is used. The controller 310 may be configured to keep deactivated the second voltage comparator 302, the counter 320 and any other circuits the operation of the first voltage comparator 301 does not require, before the time at which the first voltage comparator 301 determines that the absolute value of the voltage equals or exceeds the absolute value of the first threshold. The time delay may expire before or after the voltage becomes stable, i.e., the rate of change of the voltage is substantially zero. The phase "the rate of change of the voltage is substantially zero" means that temporal change of the voltage is less than 0.1%/ns. The phase "the rate of change of the voltage is substantially non-zero" means that temporal change of the voltage is at least 0.1%/ns.

The controller 310 may be configured to activate the second voltage comparator during (including the beginning and the expiration) the time delay. In an embodiment, the controller 310 is configured to activate the second voltage comparator at the beginning of the time delay. The term "activate" means causing the component to enter an operational state (e.g., by sending a signal such as a voltage pulse or a logic level, by providing power, etc.). The term "deactivate" means causing the component to enter a non-operational state (e.g., by sending a signal such as a voltage pulse or a logic level, by cut off power, etc.). The operational state may have higher power consumption (e.g., 10 times higher, 100 times higher, 1000 times higher) than the non-operational state. The controller 310 itself may be deactivated until the output of the first voltage comparator 301 activates the controller 310 when the absolute value of the voltage equals or exceeds the absolute value of the first threshold.

The controller 310 may be configured to cause the number registered by the counter 320 to increase by one, if, during the time delay, the second voltage comparator 302 determines that the absolute value of the voltage equals or exceeds the absolute value of the second threshold.

The controller 310 may be configured to cause the voltmeter 306 to measure the voltage upon expiration of the time delay. The controller 310 may be configured to connect the electrode to an electrical ground, so as to reset the voltage and discharge any charge carriers accumulated on the electrode. In an embodiment, the electrode is connected to an electrical ground after the expiration of the time delay. In an embodiment, the electrode is connected to an electrical ground for a finite reset time period. The controller 310 may connect the electrode to the electrical ground by controlling the switch 305. The switch may be a transistor such as a field-effect transistor (FET).

In an embodiment, the system 121 has no analog filter network (e.g., a RC network). In an embodiment, the system 121 has no analog circuitry.

The voltmeter 306 may feed the voltage it measures to the controller 310 as an analog or digital signal.

Figure 4:
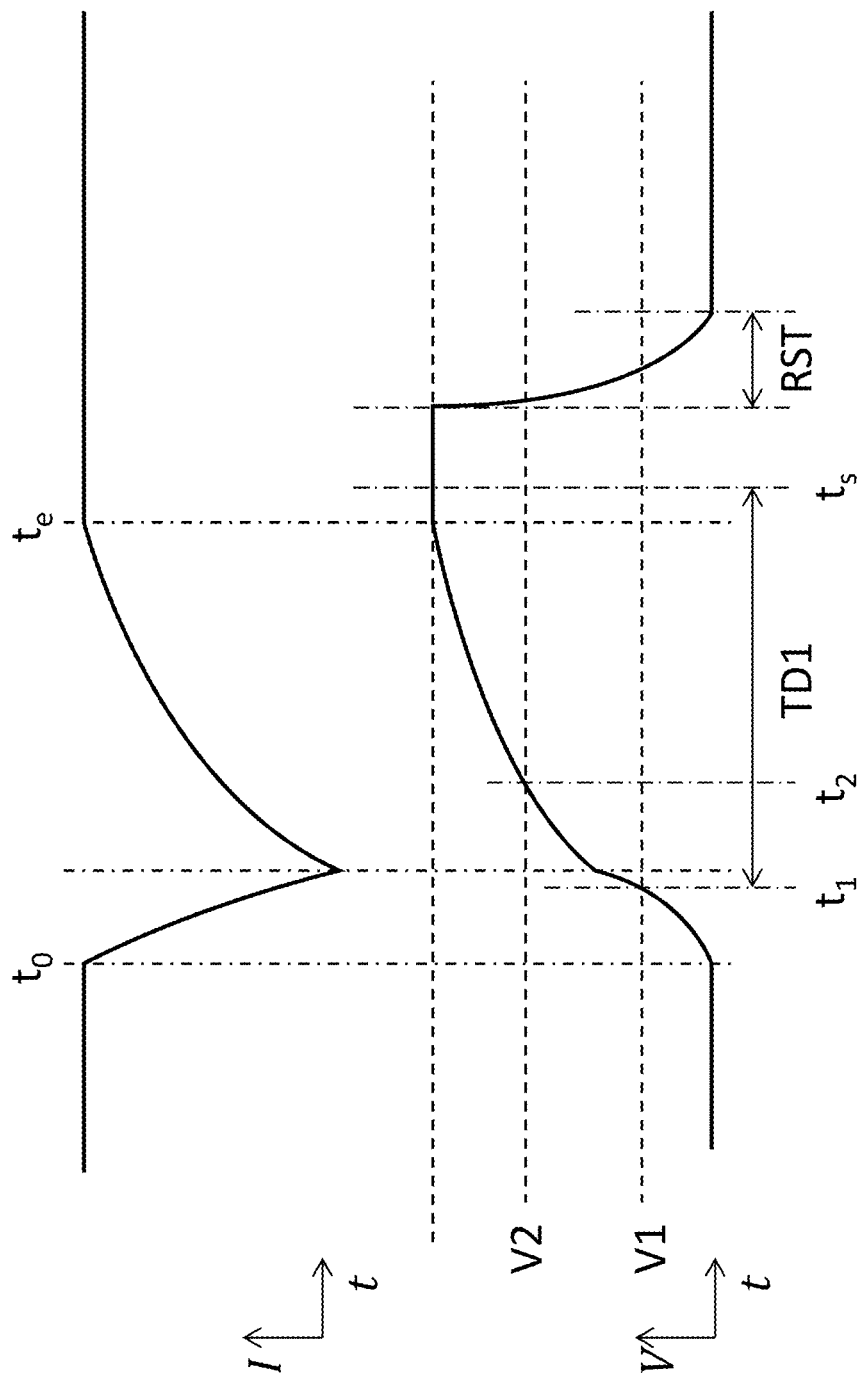
FIG. 4 schematically shows a temporal change of the electric current flowing through an electrode (upper curve) of a diode or an electrical contact of a resistor of a radiation absorption layer exposed to radiation, the electric current caused by charge carriers generated by a radiation photon incident on the radiation absorption layer, and a corresponding temporal change of the voltage of the electrode (lower curve), according to an embodiment.

The electronic system 121 may include a capacitor module 309 electrically connected to the electrode of the diode 300 or the electrical contact, wherein the capacitor module is configured to collect charge carriers from the electrode. The capacitor module can include a capacitor in the feedback path of an amplifier. The amplifier configured as such is called a capacitive transimpedance amplifier (CTIA). CTIA has high dynamic range by keeping the amplifier from saturating and improves the signal-to-noise ratio by limiting the bandwidth in the signal path. Charge carriers from the electrode accumulate on the capacitor over a period of time ("integration period") (e.g., as shown in FIG. 4, between $t_0$ to $t_1$, or $t_1$-$t_2$). After the integration period has expired, the capacitor voltage is sampled and then reset by a reset switch. The capacitor module can include a capacitor directly connected to the electrode.

FIG. 4 schematically shows a temporal change of the electric current flowing through the electrode (upper curve) caused by charge carriers generated by a radiation photon incident on the diode or the resistor, and a corresponding temporal change of the voltage of the electrode (lower curve). The voltage may be an integral of the electric current with respect to time. At time $t_0$, the radiation photon hits the diode or the resistor, charge carriers start being generated in the diode or the resistor, electric current starts to flow through the electrode of the diode or the resistor, and the absolute value of the voltage of the electrode or electrical contact starts to increase. At time $t_1$, the first voltage comparator 301 determines that the absolute value of the voltage equals or exceeds the absolute value of the first threshold V1, and the controller 310 starts the time delay TD1 and the controller 310 may deactivate the first voltage comparator 301 at the beginning of TD1. If the controller 310 is deactivated before $t_1$, the controller 310 is activated at $t_1$. During TD1, the controller 310 activates the second voltage comparator 302. The term "during" a time delay as used here means the beginning and the expiration (i.e., the end) and any time in between. For example, the controller 310 may activate the second voltage comparator 302 at the expiration of TD1. If during TD1, the second voltage comparator 302 determines that the absolute value of the voltage equals or exceeds the absolute value of the second threshold at time $t_2$, the controller 310 causes the number registered by the counter 320 to increase by one. At time $t_e$, all charge carriers generated by the radiation photon drift out of the first radiation absorption layer 110. At time $t_s$, the time delay TD1 expires. In the example of FIG. 4, time $t_s$ is after time $t_e$; namely TD1 expires after all charge carriers generated by the radiation photon drift out of the first radiation absorption layer 110. The rate of change of the voltage is thus substantially zero at $t_s$. The controller 310 may be configured to deactivate the second voltage comparator 302 at expiration of TD1 or at $t_2$, or any time in between.

The controller 310 may be configured to cause the voltmeter 306 to measure the voltage upon expiration of the time delay TD1. In an embodiment, the controller 310 causes the voltmeter 306 to measure the voltage after the rate of change of the voltage becomes substantially zero after the expiration of the time delay TD1. The voltage at this moment is proportional to the amount of charge carriers generated by a radiation photon, which relates to the energy of the radiation photon. The controller 310 may be configured to determine the energy of the radiation photon based on voltage the voltmeter 306 measures. One way to determine the energy is by binning the voltage. The counter 320 may have a sub-counter for each bin. When the controller 310 determines that the energy of the radiation photon falls in a bin, the controller 310 may cause the number registered in the sub-counter for that bin to increase by one. Therefore, the electronic system 121 may be able to detect a radiation image and may be able to resolve radiation photon energies of each radiation photon.

After TD1 expires, the controller 310 connects the electrode to an electric ground for a reset period RST to allow charge carriers accumulated on the electrode to flow to the ground and reset the voltage. After RST, the electronic system 121 is ready to detect another incident radiation photon. Implicitly, the rate of incident radiation photons the electronic system 121 can handle in the example of FIG. 4 is limited by 1/(TD1+RST). If the first voltage comparator 301 has been deactivated, the controller 310 can activate it at any time before RST expires. If the controller 310 has been deactivated, it may be activated before RST expires.

Figure 5:
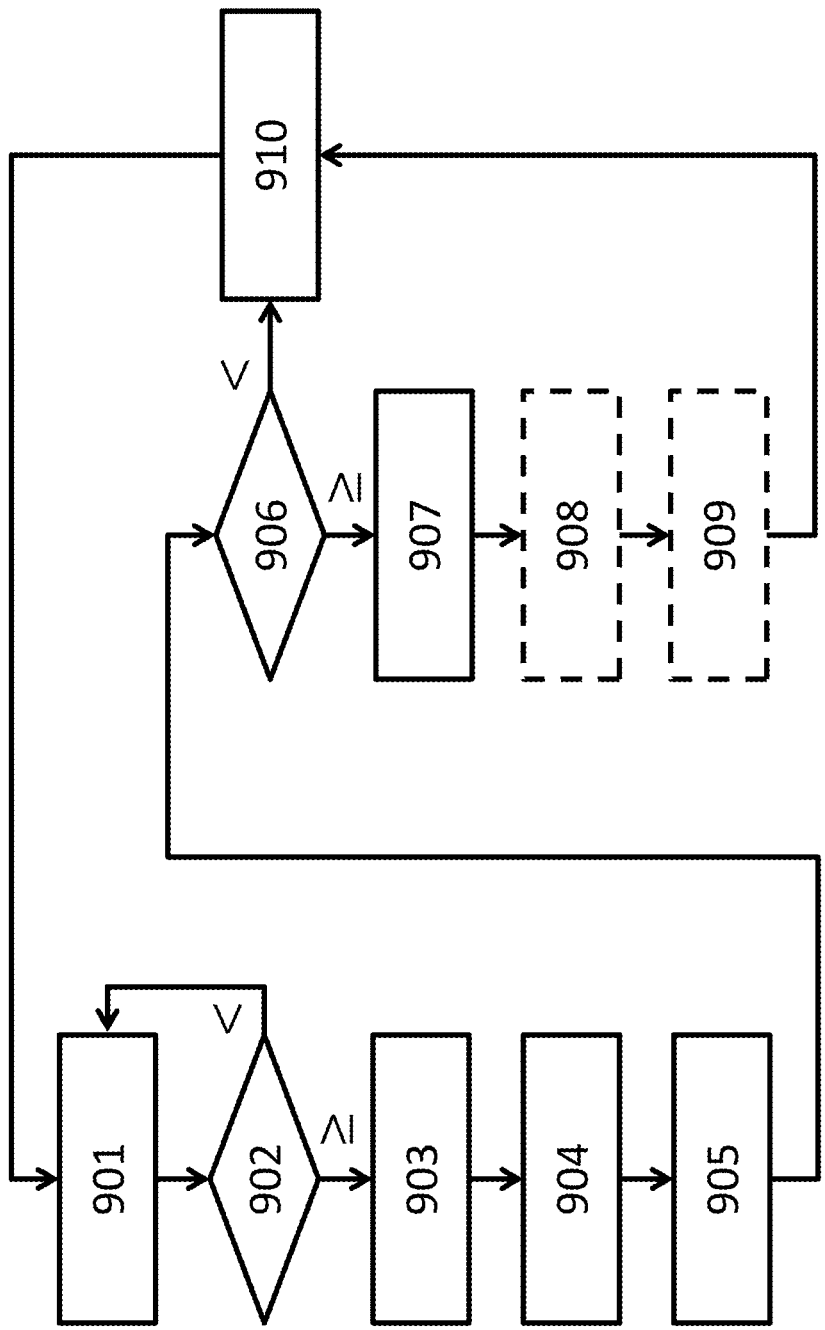
FIG. 5 shows a flow chart for a method suitable for detecting radiation using a system such as the electronic system operating as shown in FIG. 4, according to an embodiment.

FIG. 5 shows a flow chart for a method suitable for detecting radiation using a system such as the electronic system 121 operating as shown in FIG. 4. In step 901, compare, e.g., using the first voltage comparator 301, a voltage of an electrode of a diode or an electrical contact of a resistor exposed to radiation, to the first threshold. In step 902, determine, e.g., with the controller 310, whether the absolute value of the voltage equals or exceeds the absolute value of the first threshold V1. If the absolute value of the voltage does not equal or exceed the absolute value of the first threshold, the method goes back to step 901. If the absolute value of the voltage equals or exceeds the absolute value of the first threshold, continue to step 903. In step 903, start, e.g., using the controller 310, the time delay TD1. In step 904, activate, e.g., using the controller 310, a circuit (e.g., the second voltage comparator 302 or the counter 320) during the time delay TD1 (e.g., at the expiration of TD1). In step 905, compare, e.g., using the second voltage comparator 302, the voltage to the second threshold. In step 906, determine, e.g., using the controller 310, whether the absolute value of the voltage equals or exceeds the absolute value of the second threshold V2. If the absolute value of the voltage does not equal or exceed the absolute value of the second threshold, the method goes to step 910. If the absolute value of the voltage equals or exceeds the absolute value of the second threshold, continue to step 907. In step 907, cause, e.g., using the controller 310, the number registered in the counter 320 to increase by one. In optional step 908, measure, e.g., using the voltmeter 306, the voltage upon expiration of the time delay TD1. In optional step 909, determine, e.g., using the controller 310, the radiation photon energy based the voltage measured in step 908. There may be a counter for each of the energy bins. After measuring the radiation photon energy, the counter for the bin to which the photon energy belongs can be increased by one. The method goes to step 910 after step 909. In step 910, reset the voltage to an electrical ground, e.g., by connecting the electrode of the diode or an electrical contact of a resistor to an electrical ground. Steps 908 and 909 may be omitted, for example, when neighboring pixels share a large portion (e.g., >30%) of charge carriers generated from a single photon.

Figure 6:
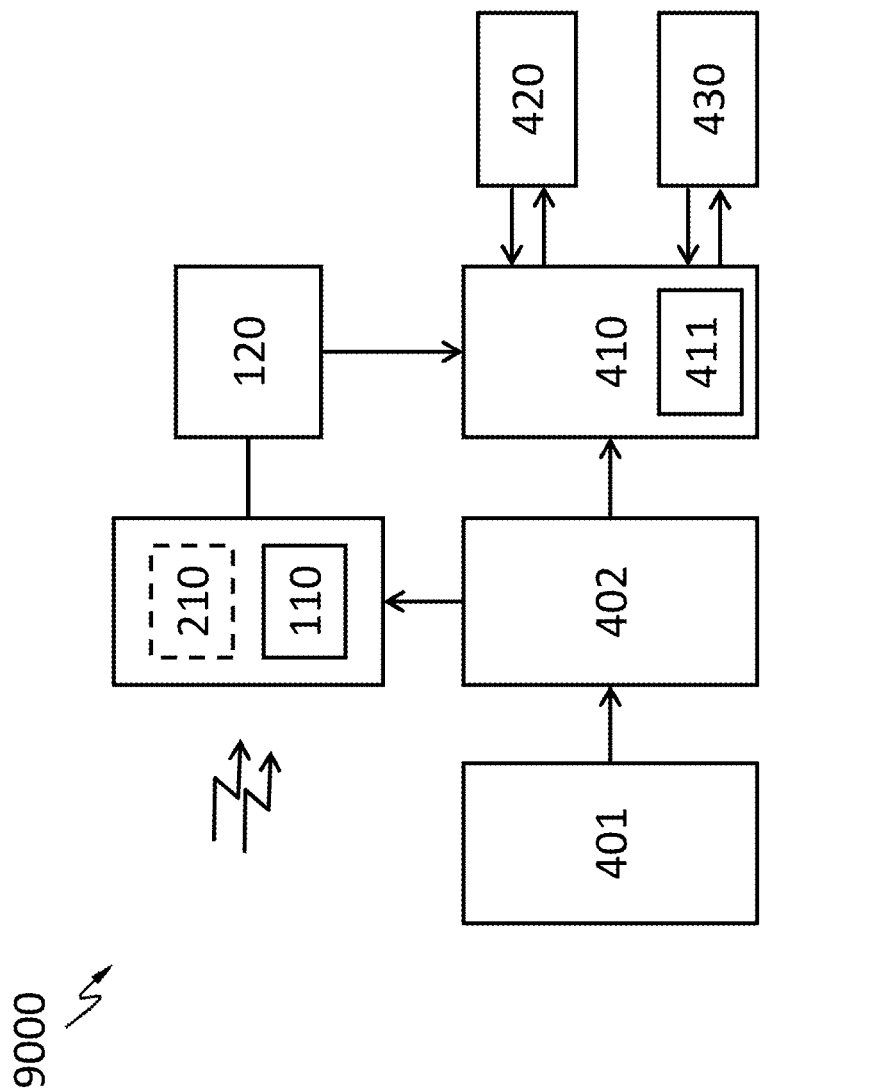
FIG. 6 schematically shows a block diagram of a system comprising a radiation detector and peripheral function units, according to an embodiment.

FIG. 6 schematically shows a block diagram of a system 9000 comprising the radiation detector 100 described herein and peripheral function units, according to an embodiment. The system 9000 comprises the first radiation absorption layer 110 and the electronic system 120 of the radiation detector 100. The system 9000 may also comprise a second radiation absorption layer 210 configured to generate second electrical signals from a photon of the radiation absorbed by the second radiation absorption layer 210, and the electronic system 120 is configured to process and analyze the second electrical signals.

The system 9000 may comprise a power supply 401 configured to provide electric power to the radiation detector 100. The power supply 401 may receive electric power from outside the system 9000, or the power supply 401 may comprise a battery to supply power to the system 9000. The system 9000 may also comprise a power management unit 402 configured to supply different internal voltages to the radiation detector 100 and other peripheral function units. The power management unit 402 may comprise a DC-to-DC converter. The DC-to-DC converter is configured to receive a DC voltage from power supply 401, for example, from the battery, and convert it to a different DC voltage (e.g., >50 V, or >100 V) to establish the external electric field in the first radiation absorption layer 110. The power management unit 402 may comprise LDO regulators to supply voltages to the other peripheral function units of the system 9000. The system 9000 may be a distributed system. Namely, the various components of the system 9000 may be on different locations. For example, the electronic system 120 may be positioned away from the first radiation absorption layer 110 or the second radiation absorption layer 210. For example, the first radiation absorption layer 110 may be integrated into a first microchip; the electronic system 120 and the power supply 401 may be integrated into a second microchip separate from the first microchip.

The system 9000 may comprise a communication interface 410 configured to communicate with inside and outside circuitries. For example, the electronic system 120 may transmit radiation photon counts to an outside circuitry through the communication interface 410. The communication interface 410 may communicate with outside circuitry through a wired connection. The communication interface 410 may comprise a wireless communication processor 411 and communicate with outside circuitry using the wireless communication processor 411. The wireless communication processor 411 may support various wireless communication protocols, such as Bluetooth, Wi-Fi, Z-wave or Zigbee.

The system 9000 may comprise a GPS receiver 420 configured to record a location of radiation detected by the radiation detector 100. Compiling the location information from GPS receiver 420 and data (e.g., radiation photon counts, radiation photon energy, and dose) from the electronic system 120, the system 9000 may generate a spatial or temporal distribution of the data.

The system 9000 may comprise a display 430 configured to show information of radiation detected by the radiation detector 100. For example, the real-time radiation photon counts may be shown in the display 430. The display 430 may be used to show recorded radiation counts combined with locations.

Figure 7:
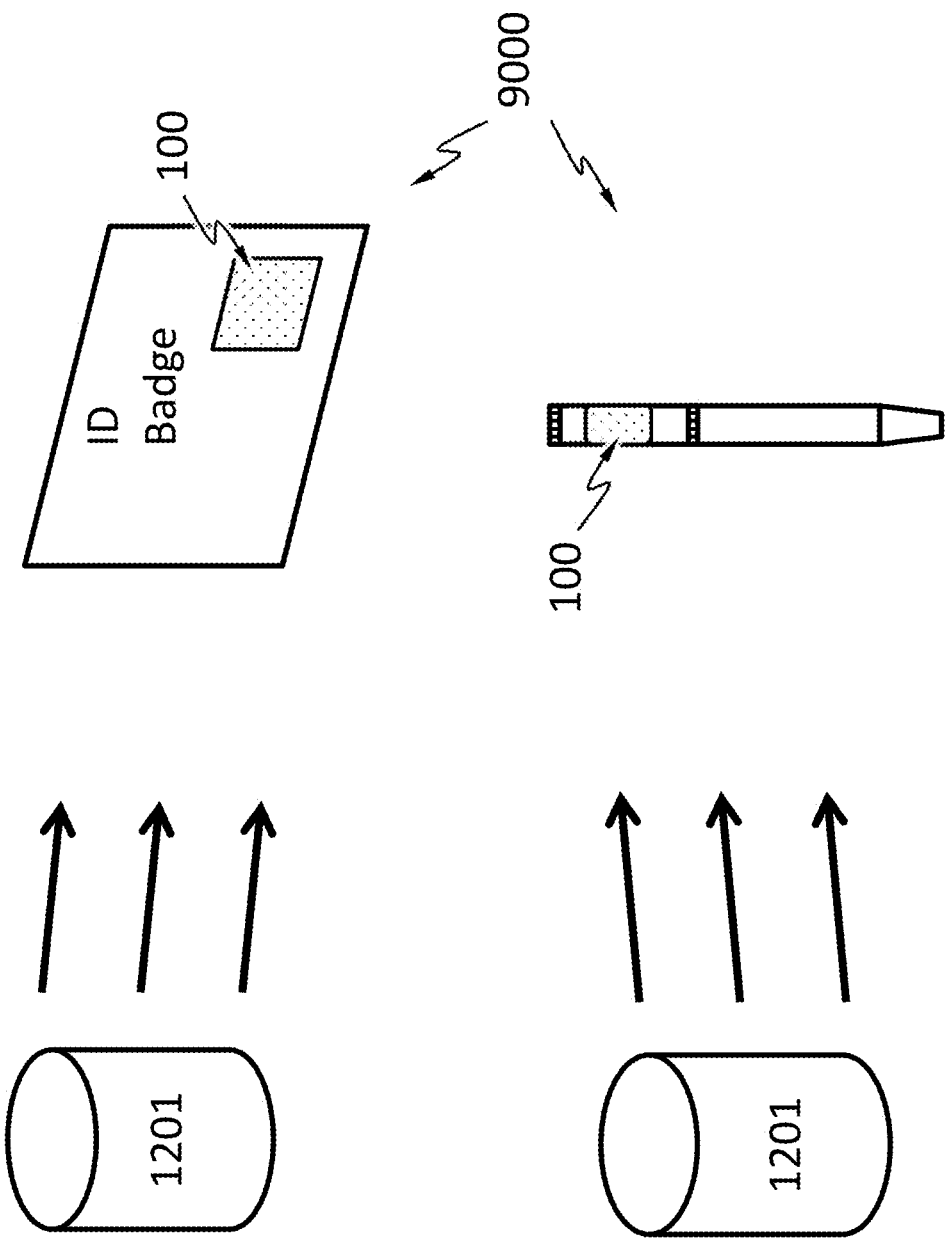
FIG. 7 schematically shows that the system may be an ID card, or an access badge or a radiation detector pen, according to an embodiment.

FIG. 7 schematically shows that the system 9000 may be an employee ID, an access badge or a radiation detector pen. An employee ID or access badge may have information about an employee printed thereon, a magnetic stripe, an RF transmitter, a microchip, or other suitable components. A radiation detector pen may have storage for ink. The system 9000 may be used in medical office, workshop, labs, or other workplace that might have potential risk of personnel radiation exposure. Radiation emitted from radiation sources 1201 can be received by the system 9000, and characteristics of the radiation (e.g., the intensity, spectrum, dose, etc.) can be determined by the system 9000. The characteristics may be displayed in the system 9000 or transmitted to anther data analysis device. Based on the characteristics of the radiation detected by the system 9000, the radiation exposure risk can be therefore estimated.

Figure 8:
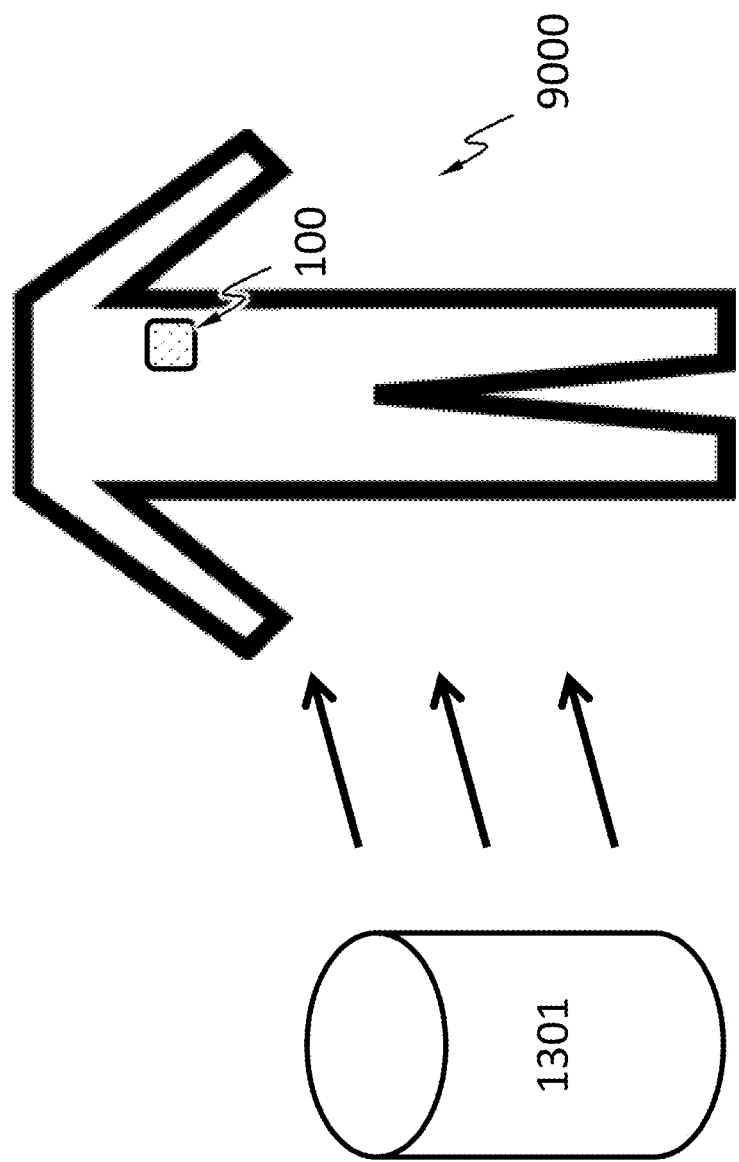
FIG. 8 schematically shows that the system may be a piece of apparel, according to an embodiment.

FIG. 8 schematically shows that the system 9000 may be a piece of apparel. The system 9000 may be used for monitoring radiation in a workplace or home. Radiation emitted from the radiation source 1301 can be received by the system 9000, and characteristics of the radiation (e.g., the intensity, spectrum, dose, etc.) can be determined by the system 9000. The characteristics may be displayed in the system 9000 or transmitted to anther data analysis device. Based on the characteristics of the radiation detected by the system 9000, the radiation exposure risk can be therefore estimated. By combining the locations with the characteristics, locations with high levels of radiation may be identified.

Figure 9:
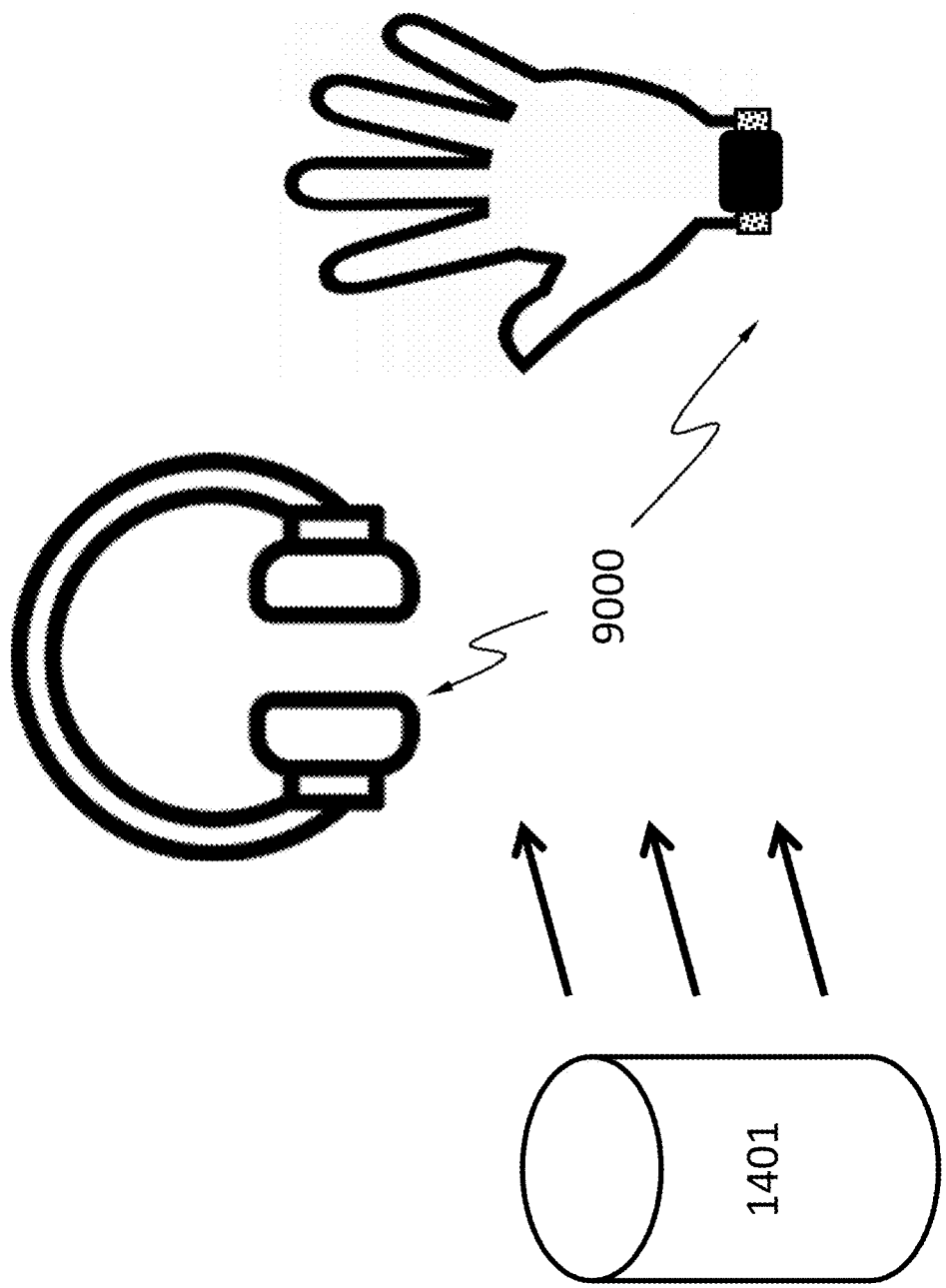
FIG. 9 schematically shows that the system may be a wristband or a watch, according to an embodiment.

FIG. 9 schematically shows that the system 9000 may be a wristband, a headphone, or a watch. Radiation emitted from the radiation source 1401 can be received by the system 9000, and characteristics of the radiation (e.g., the intensity, spectrum, dose, etc.) can be determined by the system 9000. The characteristics may be displayed in the system 9000 or transmitted to anther data analysis device. For example, the wristband or electronic watch may give its bearer a warning message if it detects that the nearby radiation level exceeds a preset value. The system 9000 may record the location of the radiation level.

Figure 10:
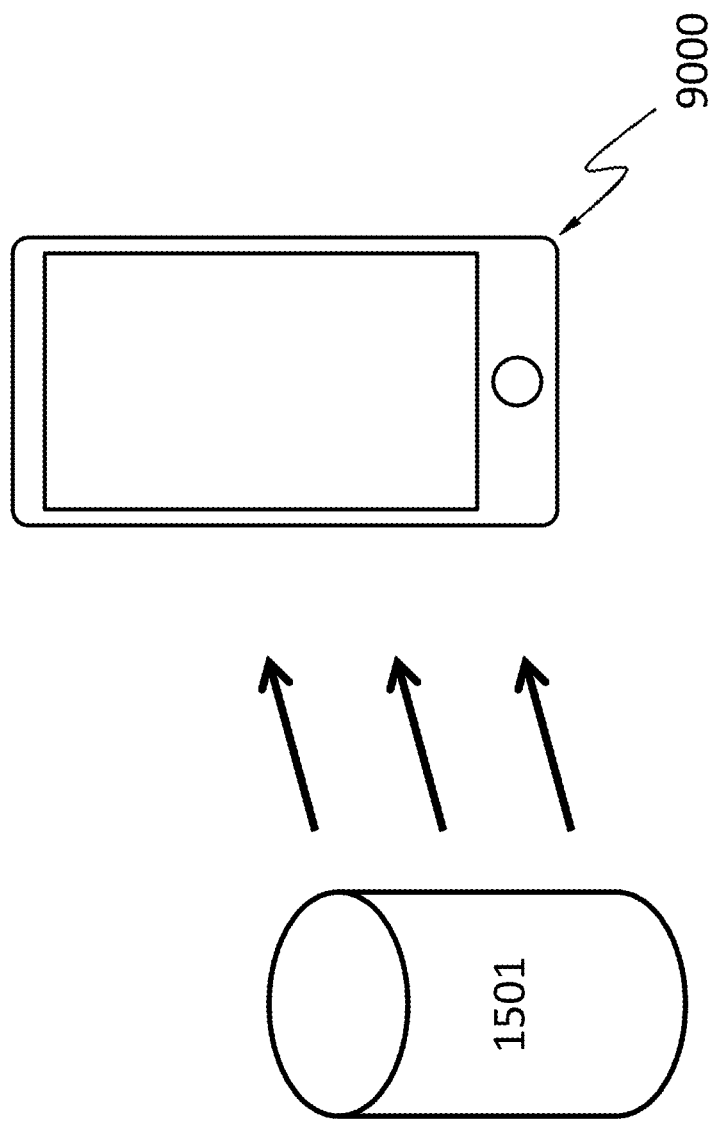
FIG. 10 schematically shows that the system may be a cell phone, according to an embodiment.

FIG. 10 schematically shows that the system 9000 may be a cell phone or an accessory to a cell phone. If the system 9000 is an accessory, it may be externally mounted to the cell phone. Radiation emitted from the radiation source 1501 can be received by the system 9000, and characteristics of the radiation (e.g., the intensity, spectrum, dose, etc.) can be determined by the system 9000. The characteristics may be displayed on the cell phone screen, or processed and stored in cell phone applications.

Figure 11:
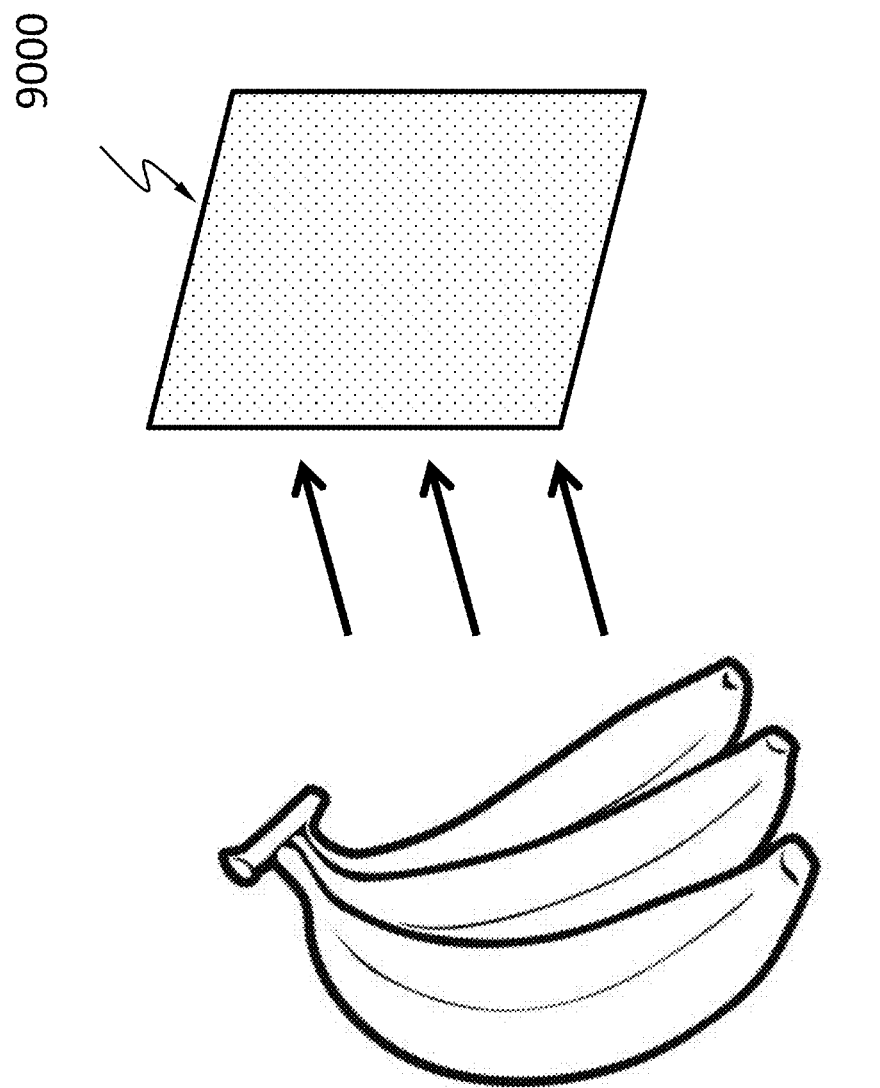
FIG. 11 schematically shows that the system may be a food radiation detection apparatus, according to an embodiment.

FIG. 11 schematically shows that the system 9000 may be a food radiation detection apparatus. Radiation emitted from food inspected may be received by the system 9000, and characteristics of the radiation (e.g., the intensity, spectrum, dose, radiation residue existing in the food and the type of radiation residue, etc.) can be determined by the system 9000. The characteristics may be displayed in the system 9000 or transmitted to anther data analysis device.

Figure 12:
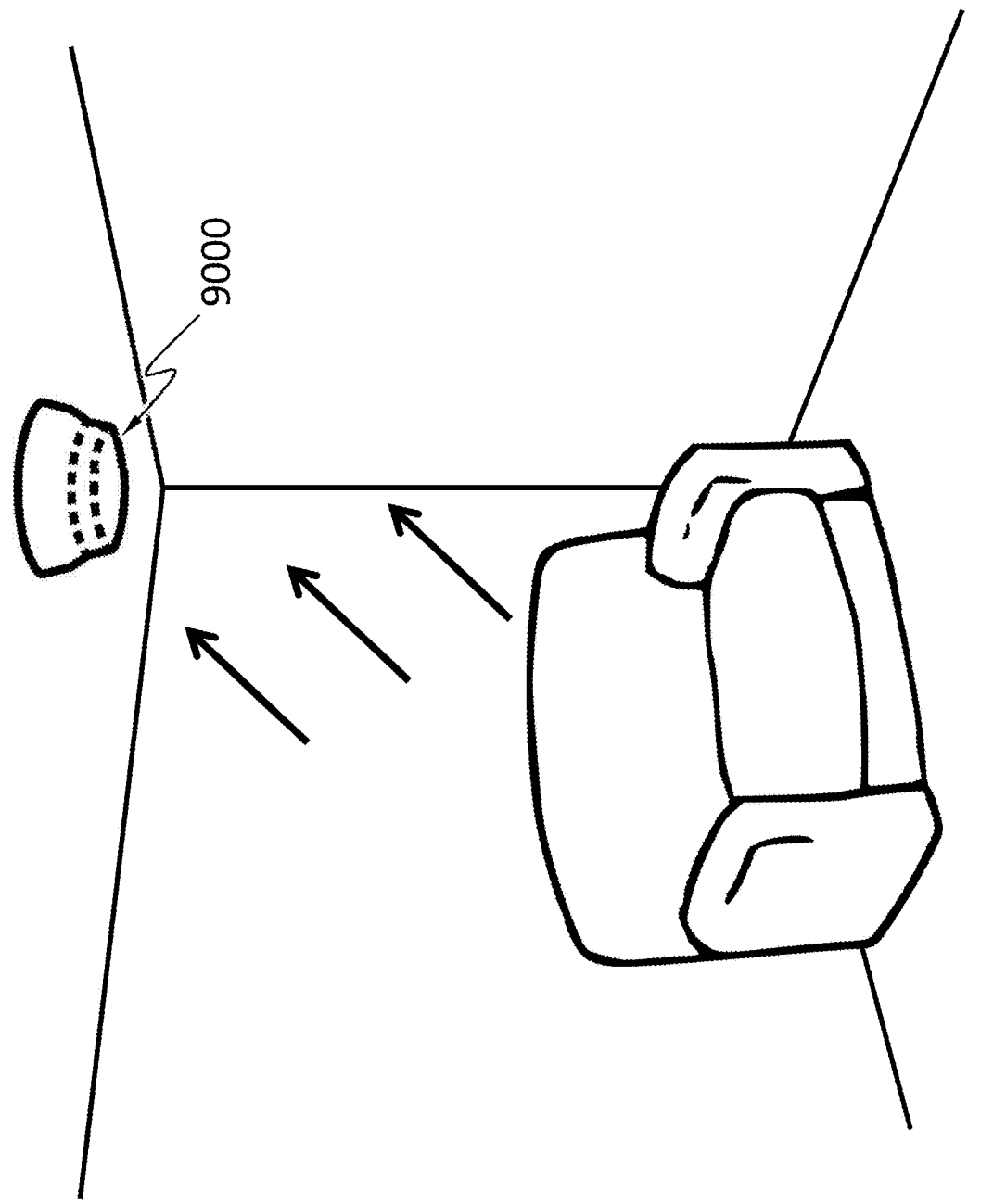
FIG. 12 schematically shows that the system may be a smoke detector, according to an embodiment.

FIG. 12 schematically shows that the system 9000 may be a smoke detector. The system 9000 may be a part of a smoke detector, monitoring and collecting the radiation level of the household. The system 9000 may be configured to send out alarm if a preset radiation level is exceeded. The system 9000 may be configured to collect and record the radiation level over a time period.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
an apparatus suitable for detecting radiation, the apparatus comprising:
(i) a first radiation absorption layer configured to generate first electrical signals from a photon of the radiation absorbed by the first radiation absorption layer, wherein the first radiation absorption layer comprises a first electrode;
(ii) an electronic system configured to process the first electrical signals, wherein the electronic system comprises:
a first voltage comparator configured to compare a voltage of the first electrode to a first threshold;
a second voltage comparator configured to compare the voltage to a second threshold;
a counter configured to register a number of photons of the radiation absorbed by the first radiation absorption layer;
a controller;
wherein the controller is configured to start a time delay from a time at which the first voltage comparator determines that an absolute value of the voltage equals or exceeds an absolute value of the first threshold;
wherein the controller is configured to activate the second voltage comparator during the time delay;
wherein the controller is configured to cause the number registered by the counter to increase by one, if the second voltage comparator determines that an absolute value of the voltage equals or exceeds an absolute value of the second threshold;
(iii) a power supply; and
(iv) a communication interface configured for the electronic system to communicate with outside circuitry;
wherein the system is selected from a group consisting of a ID card, an access badge, a radiation detection pen, a piece of apparel, a wristband, a watch, a headphone, a cell phone, a cell phone accessory, a smoke detector, and a food radiation detection apparatus.

2. The system of claim 1, further comprising a capacitor module electrically connected to the first electrode, wherein the capacitor module is configured to collect charge carriers from the first electrode.

3. The system of claim 1, wherein the controller is configured to activate the second voltage comparator at a beginning or expiration of the time delay.

4. The system of claim 1, further comprising a voltmeter, wherein the controller is configured to cause the voltmeter to measure the voltage upon expiration of the time delay.

5. The system of claim 4, wherein the controller is configured to determine an energy of a photon of the radiation based on a value of the voltage measured upon expiration of the time delay.

6. The system of claim 1, wherein the controller is configured to connect the first electrode to an electrical ground.

7. The system of claim 1, wherein a rate of change of the voltage is substantially zero at expiration of the time delay.

8. The system of claim 1, wherein a rate of change of the voltage is substantially non-zero at expiration of the time delay.

9. The system of claim 1, wherein the controller is configured to deactivate the first voltage comparator at a beginning of the time delay.

10. The system of claim 1, wherein the controller is configured to deactivate the second voltage comparator at expiration of the time delay or at a time when the second voltage comparator determines that the absolute value of the voltage equals or exceeds the absolute value of the second threshold, or a time in between.

11. The system of claim 1, wherein the first radiation absorption layer comprises a diode.

12. The system of claim 1, wherein the first radiation absorption layer comprises silicon, germanium, GaAs, CdTe, CdZnTe, or a combination thereof.

13. The system of claim 1, wherein the apparatus does not comprise a scintillator.

14. The system of claim 1, wherein the apparatus comprises a second radiation absorption layer configured to generate second electrical signals from a photon of the radiation absorbed by the second radiation absorption layer, wherein an electronic system is configured to process the second electrical signals.

15. The system of claim 1, wherein the electronic system of the first radiation absorption layer is not stacked with the first radiation absorption layer.

16. The system of claim 1, wherein the power supply comprise a battery.

17. The system of claim 1, wherein the power supply comprises a DC-to-DC converter.

18. The system of claim 1, further comprising a GPS receiver configured to record a location of radiation detected by the apparatus.

19. The system of claim 1, further comprising a display configured to show information of radiation detected by the apparatus.

20. The system of claim 1, further comprising a wireless transmitter configured to transmit information of radiation detected by the apparatus to a receiving device.

* * * * *